(12) United States Patent
Choi et al.

(10) Patent No.: US 8,149,357 B2
(45) Date of Patent: Apr. 3, 2012

(54) LIGHT ABSORPTION LAYER FOR A DISPLAY DEVICE

(75) Inventors: Nak-Cho Choi, Seoul (KR); Min Kang, Seoul (KR); Hoon Kang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 425 days.

(21) Appl. No.: 12/470,387

(22) Filed: May 21, 2009

(65) Prior Publication Data

US 2010/0033657 A1 Feb. 11, 2010

(30) Foreign Application Priority Data

Aug. 5, 2008 (KR) .................. 10-2008-0076450

(51) Int. Cl.
*G02F 1/1335* (2006.01)

(52) U.S. Cl. ............ 349/104; 349/56; 349/84; 349/122; 349/123

(58) Field of Classification Search .................. 349/56, 349/84, 104, 122, 123
See application file for complete search history.

(56) References Cited

U.S. PATENT DOCUMENTS

| 7,092,059 B2 * | 8/2006 | Tsuboi et al. ................. 349/128 |
| 2007/0002248 A1 * | 1/2007 | Chang et al. .................. 349/141 |

* cited by examiner

*Primary Examiner* — Jennifer Doan
(74) *Attorney, Agent, or Firm* — Innovation Counsel LLP

(57) ABSTRACT

A liquid crystal display is presented. The liquid crystal display includes: a first substrate; a pixel electrode formed on the first substrate; a first alignment layer formed on the pixel electrode; a second substrate facing the first substrate; a common electrode formed on the second substrate; a second alignment layer formed on the common electrode; a liquid crystal layer formed between the first alignment layer and the second alignment layer; and a light absorption layer formed between the first substrate and the first alignment layer, or the second substrate and the second alignment layer, wherein the light absorption layer absorbs light having a UV wavelength between about 280 nm and about 450 nm.

16 Claims, 7 Drawing Sheets

LIGHT ABSORPTION LAYER FOR A DISPLAY DEVICE

CROSS-REFERENCE TO RELATED APPLICATION

This application claims priority to and the benefit of Korean Patent Application No. 10-2008-0076450 filed in the Korean Intellectual Property Office on Aug. 5, 2008, the entire content of which is incorporated herein by reference.

BACKGROUND OF THE INVENTION (a) Field of the Invention

The present invention relates to a liquid crystal display including an overcoat layer.

(b) Description of the Related Art

In a liquid crystal element, images are displayed by switching the orientation of liquid crystals between transparent conductive glass surfaces through an external electric field. The liquid crystals are aligned in a predetermined direction at the interface between the liquid crystals and the transparent conductive glass surface. The degree of uniformity in the liquid crystal alignment is an important factor for determining the display quality of the liquid crystal display.

Rubbing is a conventional method of aligning liquid crystals. In the rubbing method, a polymer layer (such as polyimide) is coated on a substrate (such as glass) and the surface is rubbed in a predetermined direction by using a fiber (such as nylon or polyester). A disadvantage of this method is that minute particles or an electrostatic discharge (ESD) may be generated when the fiber and the polymer layer are rubbed against each other, and they may cause a serious problem during the manufacturing of the liquid crystal panel.

To avoid this problem, an alternative alignment method that uses light is researched. In this photo-alignment method, anisotropy is provided to the polymer layer by light irradiation to align the liquid crystals.

The photo alignment method uses a polymer having an optical functional reactor such as azobenzene, cumarine, chalcone, and cinnamate, and an optical isomerization or a photo-crosslink may anisotropically take place by irradiating the polymers with the polarized light such that the polymer anisotropy is formed on the surface of the polymer layer, thereby aligning the liquid crystal in the predetermined direction.

In the conventional structure of the photo alignment layer, the vertical alignment layer is irradiated with ultraviolet (UV) rays at an oblique angle to determine the alignment direction and the alignment angle of the liquid crystals. If the photo alignment layer is used, the pixel is divided into multiple domains (four domains) by a simple method regardless of the size of the pixel to pre-tilt the liquid crystals. This pre-tilting that is achieved by photo alignment improves the transmittance and the response time of the liquid crystals when compared to the conventional patterned vertical array (PVA).

However, when a color filter or a black matrix (BM) is formed on the lower substrate, the pre-tilt angle of the alignment layer may be changed by external fluorescent lights having a UV wavelength in a specific region.

The above information disclosed in this Background section is only for enhancement of understanding of the background of the invention and therefore it may contain information that does not form the prior art that is already known in this country to a person of ordinary skill in the art.

SUMMARY OF THE INVENTION

Accordingly, the present invention increases the alignment stability by forming the overcoat on the upper substrate.

In one aspect, the invention is a liquid crystal display that includes: a first substrate; a pixel electrode disposed on the first substrate; a first alignment layer disposed on the pixel electrode; a second substrate facing the first substrate; a common electrode disposed on the second substrate; a second alignment layer disposed on the common electrode; a liquid crystal layer disposed between the first alignment layer and the second alignment layer; and a light absorption layer disposed between the first substrate and the first alignment layer, or the second substrate and the second alignment layer, wherein the light absorption layer absorbs light having a UV wavelength of about 280 nm to about 450 nm.

The liquid crystal display may further include: an insulating layer disposed on the first substrate; a switching element portion disposed on the insulating layer and including signal lines, a source electrode, and a drain electrode; a passivation layer disposed on the switching element portion; a color filter disposed on the passivation layer; a cover layer covering the color filter; and an overcoat disposed between the second substrate and the common electrode, wherein the drain electrode is connected to the pixel electrode.

At least one of the insulating layer, the passivation layer, the color filter, the cover layer and the overcoat may be the light absorption layer.

The light absorption layer may include a polymer layer combined with a light alignment monomer.

The light alignment monomer may include an acrylate group or benzene derivative.

The light alignment monomer may include a functional group having one selected from the group of below-described molecule structures (a) to (g).

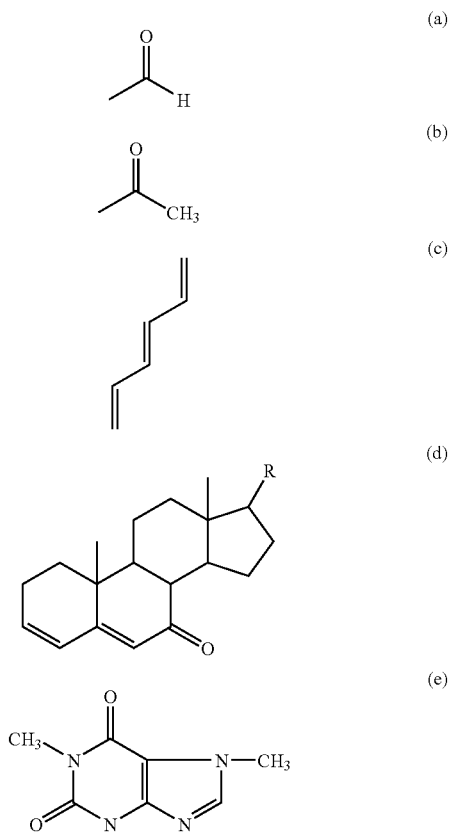

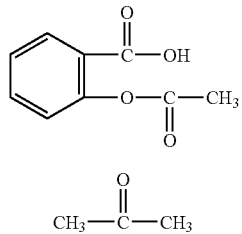

The light absorption layer may be made of a photo reactive compound as represented below by Chemical Formula 1.

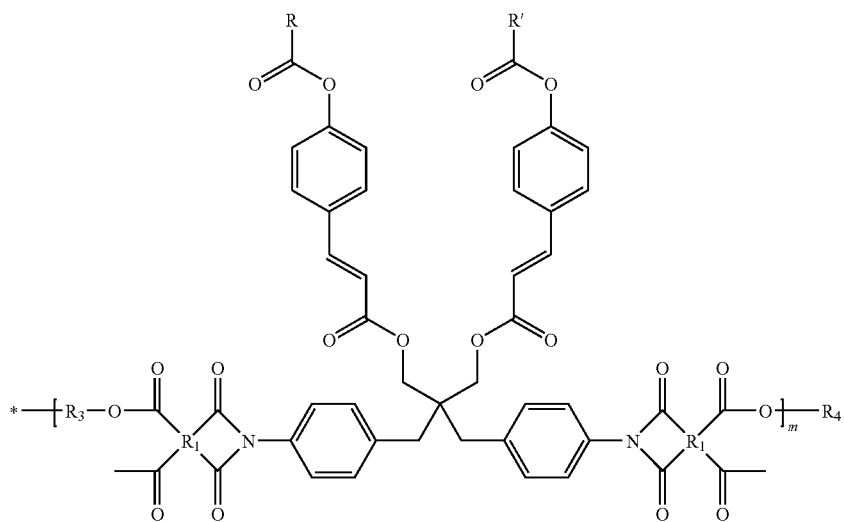

In the above Chemical Formula 1, R and R' as vertical revelation portions are —$C_nH_{2n+1}$, n is an integer from 1 to 18, and $R_1$ is an aromatic compound.

The first alignment layer and the second alignment layer may include a structure that a polymer layer combines with a light alignment monomer of a cinnamate group.

The polymer layer may be formed of one photo reactive compound selected from the group of polyimide and derivatives thereof, polyacrylate and derivatives thereof, polymethylmetacrylate and derivatives thereof, polystyrene and derivatives thereof, and polyvinylalcohol and derivatives thereof.

The first alignment layer and the second alignment layer may include the underlying light absorption, and the light absorption layer absorbs light of UV wavelength of 280 nm to 450 nm.

In another aspect, the invention is a liquid crystal display that includes: a first substrate; a pixel electrode disposed on the first substrate; a first alignment layer disposed on the pixel electrode; a second substrate facing the first substrate; a common electrode disposed on the second substrate; a second alignment layer disposed on the common electrode; a liquid crystal layer disposed between the first alignment layer and the second alignment layer; and an overcoat formed between the second substrate and the common electrode, wherein the overcoat absorbs light of UV wavelength from 280 nm to 450 nm.

The overcoat may include a polymer layer combined with a light alignment monomer including an acrylate group or benzene derivatives.

The overcoat may be made of a photo reactive compound as represented below by Chemical Formula 2.

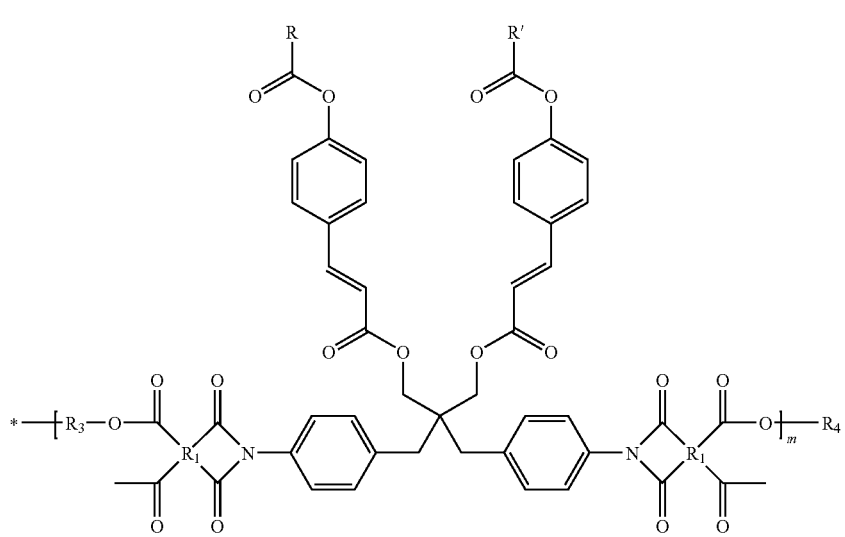

In the above Chemical Formula 2, R and R' as vertical revelation portions are —$C_nH_{2n+1}$, n is an integer from 1 to 18, and $R_1$, $R_2$, and $R_3$ are aromatic compounds.

The liquid crystal display may further include: a switching element portion disposed on the substrate and including signal lines, a source electrode, and a drain electrode; a passivation layer disposed on the switching element portion; a color filter disposed on the passivation layer; and a cover layer covering the color filter, wherein the drain electrode is connected to the pixel electrode.

The liquid crystal display may further include a light blocking member disposed between the color filter and the cover layer.

The first alignment layer and the second alignment layer may include a structure that a polymer layer combines with a light alignment monomer of a cinnamate group. The overcoat may include a functional group for absorbing the same wavelength as UV wavelength absorbed by the monomer of the first alignment layer and the second alignment layer.

The liquid crystal display may further include a color filter and a light blocking member formed on the second substrate, wherein the overcoat covers the color filter and the light blocking member.

In another aspect, the invention is a liquid crystal display that includes: a first substrate; a pixel electrode disposed on the first substrate; a first alignment layer disposed on the pixel electrode; a second substrate facing the first substrate; a common electrode disposed on the second substrate; a second alignment layer disposed on the common electrode; and a liquid crystal layer disposed between the first alignment layer and the second alignment layer, wherein the thickness of the common electrode is in the range of 350 Å to 550 Å.

The common electrode may be made of indium tin oxide (IZO).

The liquid crystal display may further include: a switching element portion disposed on the substrate and including signal lines, a source electrode, and a drain electrode; a passivation layer disposed on the switching element portion; a color filter disposed on the passivation layer; and a cover layer covering the color filter, wherein the drain electrode is connected to the pixel electrode.

The liquid crystal display may further include a light blocking member formed between the color filter and the cover layer.

The thickness of the common electrode may be 450 Å.

Accordingly, in the liquid crystal display according to an exemplary embodiment of the present invention, the overcoat absorbs light of the wavelength of the specific region generated from external lights such that it is prevented that the pre-tilt of the light alignment layer is changed, thereby preventing alignment spots.

DETAILED DESCRIPTION OF THE EMBODIMENTS

Figure 1:
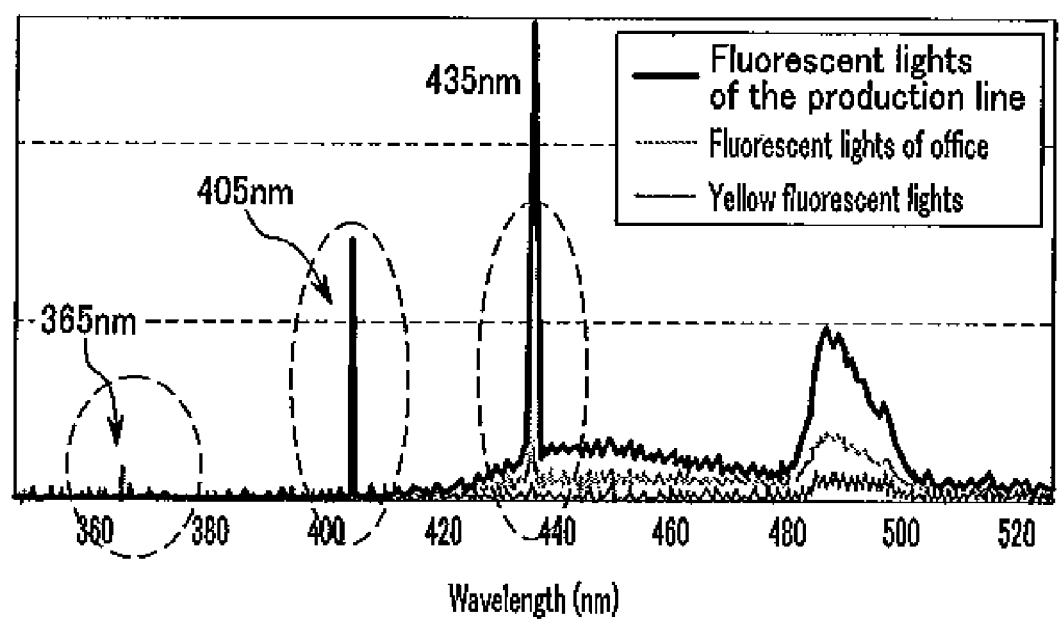
FIG. 1 is a graph showing a wavelength spectrum generated according to the kind of external fluorescent lights.

An exemplary embodiment of the present invention will hereinafter be described in detail with reference to the accompanying drawings. As those skilled in the art would realize, the described embodiments may be modified in various different ways, all without departing from the spirit or scope of the present invention. The present exemplary embodiments provide complete disclosure of the present invention and complete information of the scope of the present invention to those skilled in the art.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present.

FIG. 1 is a graph showing a wavelength spectrum generated according to the kind of external fluorescent lights.

FIG. 1 shows that a yellow fluorescent light used in a process using an optical reaction, for example a photo process, has a wavelength that is greater than 480 nm. A typical office fluorescent light has a wavelength of 365 nm and wavelengths greatere than 420 nm, and the fluorescent lights on a production line have a wavelength of 405 nm and wavelengths greater than 420 nm. The production line and the office use lights of a wavelength such as 365 nm, 405 nm, and 435 nm, do not overlap with the range of wavelengths of the yellow fluorescent lights, and this is the main reason alignment spots are generated.

When making a liquid crystal display by using the photo alignment layer, the color filter or the black matrix is formed on the lower substrate to maximize the transmittance and simplify the manufacturing process. However, the liquid crystal display is exposed to external lights, thereby deteriorating the luminance in the manufacturing process of the liquid crystal display. Also, if the liquid crystal display is used for a long time, the photo alignment layer exposed to the fluorescent lights may be deteriorated. This is one of the reasons the pre-tilt angle of the alignment layer gets changed, causing the polar angle and the azimuthal angle to become twisted.

Figure 2:
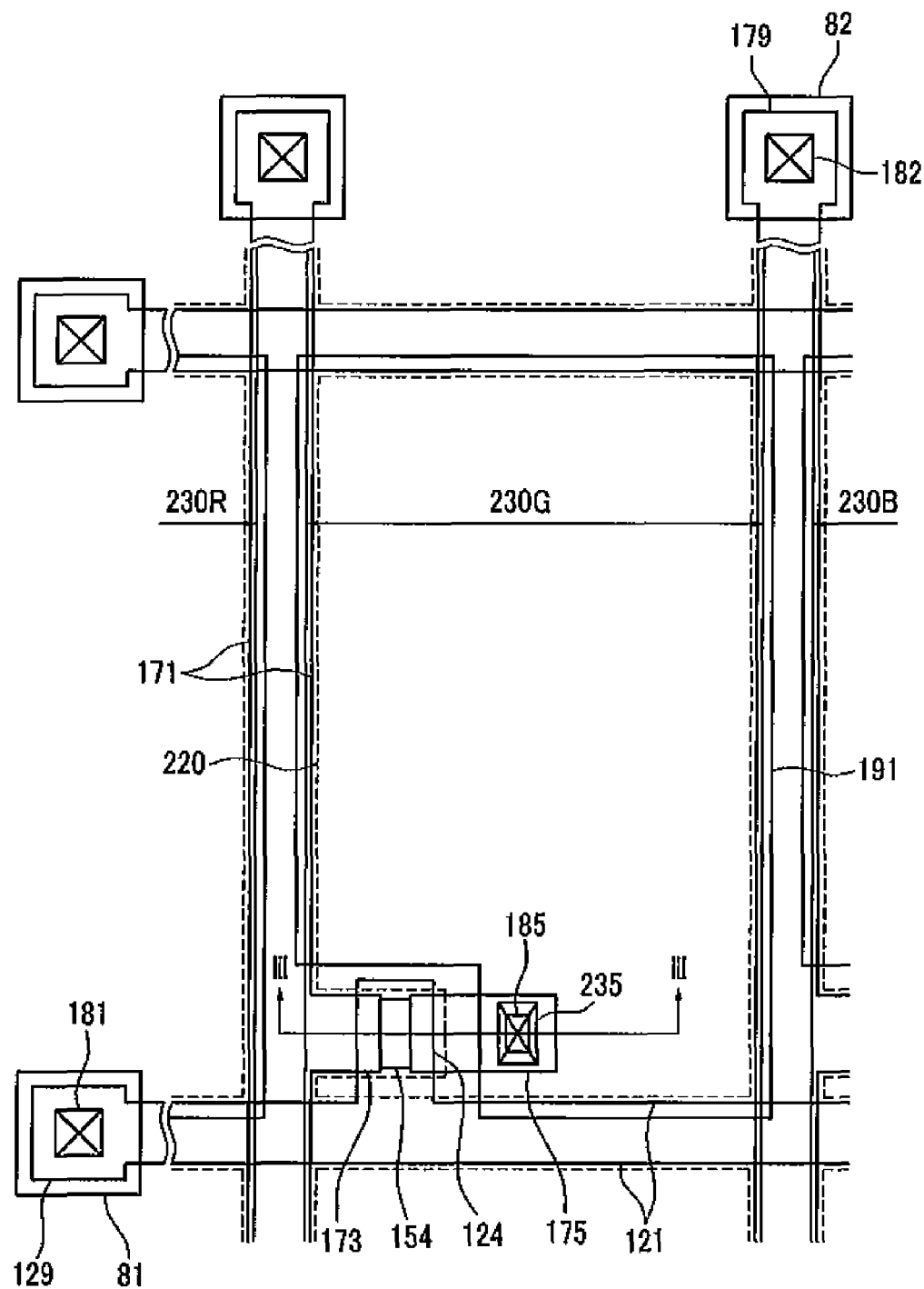
FIG. 2 is a layout view of a liquid crystal display according to an exemplary embodiment of the present invention.
Figure 3:
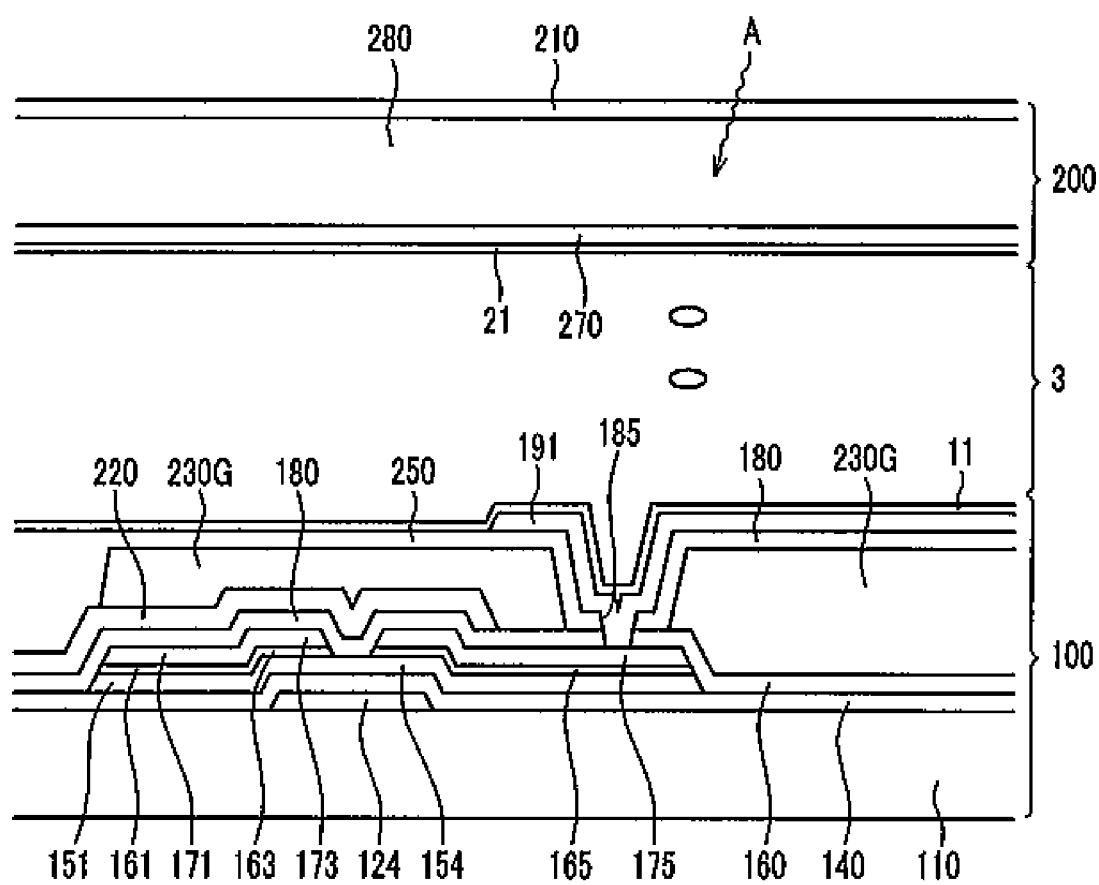
FIG. 3 is a cross-sectional view of the liquid crystal display shown in FIG. 2 taken along the lines III-III according to an exemplary embodiment of the present invention.

FIG. 2 is a layout view of a liquid crystal display according to an exemplary embodiment of the present invention. FIG. 3 is a cross-sectional view of the liquid crystal display shown in FIG. 2 taken along the lines III-III according to an exemplary embodiment of the present invention.

Referring to FIG. 2 and FIG. 3, a liquid crystal display according to an exemplary embodiment of the present invention includes a lower panel 100 and an upper panel 200 facing each other, and a liquid crystal layer 3 interposed between the two display panels 100 and 200.

Firstly, the lower panel 100 will be described.

A switching element portion including signal lines and thin film transistors is formed on an insulation substrate 110 made of transparent glass or plastic. The switching element portion may include a plurality of gate lines 121 and a plurality of storage electrode lines (not shown). Portions of the gate lines 121 form a gate electrode 124. A gate insulating layer 140 preferably made of silicon nitride (SiNx) or silicon oxide (SiOx) is formed on the gate line 121. A plurality of semiconductor islands 154 made of amorphous silicon or polysilicon are formed on the gate insulating layer 124. The semiconductor islands 154 are disposed on the gate electrodes 124. An insulating layer (not shown) may be disposed between the switching element portion including the signal lines and thin film transistors, and the insulation substrate 110.

A plurality of pairs of ohmic contact islands 161, 163, 165 are formed on the semiconductor islands 154. The ohmic contacts 161, 163, 165 may be formed of n+ hydrogenated amorphous silicon heavily doped with an n-type impurity such as phosphorous, or they may be made of silicide.

A plurality of data lines 171 and a plurality of drain electrodes 175 are formed on the ohmic contacts 161, 163, 165 and the gate insulating layer 121.

The data lines 171 transmit data voltages and extend in a longitudinal direction thereby intersecting the gate lines 121 and the storage electrode lines (not shown). Each data line 171 includes a plurality of source electrodes 173 extending toward the gate electrodes 124 and curved with a "U" shape.

The drain electrodes 175 are separated from the data lines 171 and are opposite to the source electrodes 173 with respect to the gate electrodes 124.

One gate electrode 124, one source electrode 173, and one drain electrode 175 form a thin film transistor (TFT) along with one semiconductor island 154, and the channel of the thin film transistor is formed in the semiconductor island 154 between the source electrode 173 and the drain electrode 175.

A passivation layer 180 is formed on the switching element portion. The passivation layer 180 may be omitted if necessary.

A light blocking member 220 made of a singular layer or a double layer including chromium or chromium oxide, or an organic material is formed on the passivation layer 180, and a color filter 230R, 230G, 230B is formed on the light blocking member 220. The light blocking member 220 may include openings arranged with a matrix shape, and the color filter 230R, 230G, 230B includes color filters of three colors of red, green, and blue or four colors of red, green, blue, and white, and filled in the openings of the light blocking member 220.

A cover layer 250 made of a transparent organic insulating material is formed on the light blocking member 220 and the color filter 230R, 230G, 230B, and the cover layer 250 prevents the color filter 230R, 230G, 230B from being exposed and provides a flat surface. A pixel electrode 191 made of a transparent conductive material such as ITO or IZO is formed on the cover layer 250. The cover layer 250 may be omitted. The pixel electrode 191 is connected to the drain electrode 175 through a contact hole 185.

A lower alignment layer 11 is formed on the pixel electrode 191. The alignment layer 11 is irradiated with ultraviolet rays at an oblique angle, thereby imparting a pre-tilt angle of 89.2 to 89.5 degrees to the liquid crystal molecules. The prêt-tilt angle is measured with respect to the substrate 110. Accordingly, the liquid crystal molecules close to the lower alignment layer 11 are inclined slightly from an axis that is perpendicular to the substrate 110.

The liquid crystal layer 3 includes liquid crystal molecules having negative dielectric anisotropy, and are initially arranged by the upper and lower alignment layers 11 and 21 to be orthogonal to the substrates 110 and 210.

The alignment layer 11 and the upper alignment layer 21 are combined with a photo alignment monomer of a cinnamate group to the polymer layer. The polymer layer may be made of a photo reactive compound such as polyimide and its derivatives, polyacrylate and its derivatives, polymethylmetacrylate and its derivatives, polystyrene and its derivatives, and polyvinylalcohol and its derivatives.

The upper and lower alignment layers 11 and 21 may include a light absorption layer (not shown) thereunder. When forming the upper and lower alignment layers 11 and 21 on the pixel electrode 191 and the common electrode 270, the light absorption layer (not shown) may be firstly formed with a thin thickness for absorbing UV of the wavelength between about 280 nm and about 450 nm. The light absorption layer is formed to prevent light having a wavelength in the specific region from affecting the alignment stability of the upper and lower alignment layers 11 and 21.

Now, the upper panel 200 will be described.

An overcoat 280 is formed on an insulation substrate 210 made of a transparent glass or plastic. In the liquid crystal display according to an exemplary embodiment of the present invention, the color filter 230R, 230G, 230B and the light blocking member 220 are formed on the lower panel 100 such that the overcoat 280 is not needed to prevent the color filter 230 from being exposed and to provide a flat surface. In the liquid crystal display according to an exemplary embodiment of the present invention, the overcoat 280 is formed on the upper panel 200 to prevent the generation of alignment spots due to the external lights.

The overcoat 280 is made of a polymer layer combined with a photo alignment monomer. The polymer layer may be made of one photo reactive compound selected from the group of polyimide and derivatives thereof, polyacrylate and derivatives thereof, polymethylmetacrylate and derivatives thereof, polystyrene and derivatives thereof, and polyvinylalcohol and derivatives thereof.

The photo alignment monomer may include an acrylate group or benzene derivatives. The photo alignment monomer may include a functional group having the structures (a) to (g) shown below.

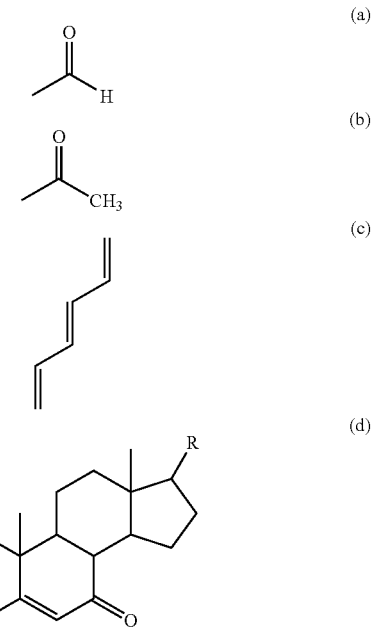

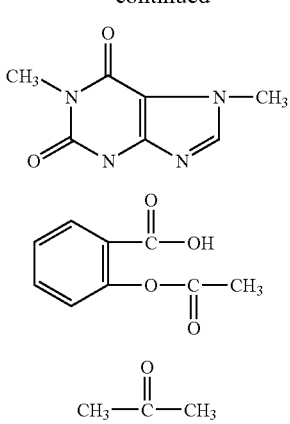

(e)

(f)

(g)

For example, the overcoat 280 may be made of the photo reactive compound represented by Chemical Formula 1 below.

Chemical Formula 1

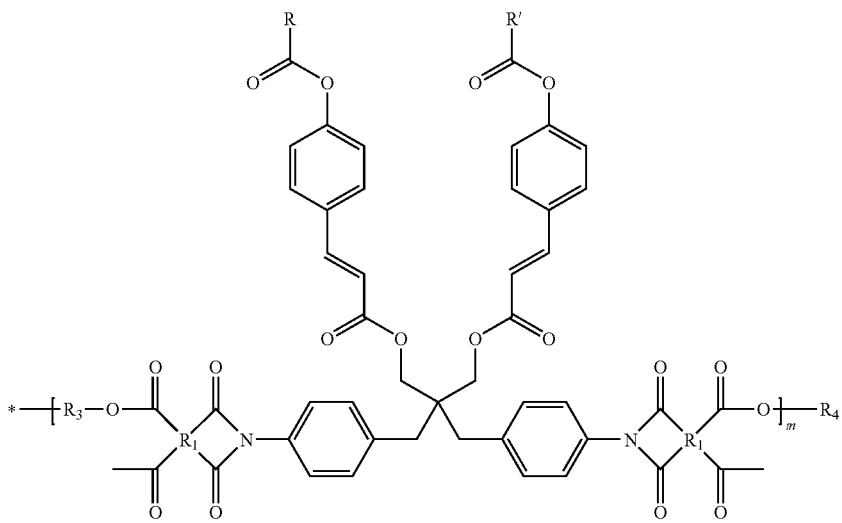

In Chemical Formula 1, R and R' as vertical revelation portions are —$C_nH_{2n+1}$, n is an integer from 1 to 18, and $R_1$ is an aromatic compound.

At least one of —$CH_2$— of R and R' in Chemical Formula 1 may be replaced with one of —O—, —(C=O)—, —O(C=O)—, benzene, benzene derivatives, cyclohexane, and cyclohexane derivatives.

The overcoat 280 is made of an organic layer that absorbs light having a UV wavelength of between about 280 nm to about 450 nm.

The overcoat 280 may have a functional group that may absorb the same wavelength as the UV wavelength absorbed by the photo alignment monomer of the lower alignment layer 11 and the upper alignment layer 21. Accordingly, any light of the specific UV wavelength A from external light sources is absorbed by the overcoat 280 and irradiation of the lower alignment layer 11 and the upper alignment layer 21 by UV wavelength A is avoided. This way, deterioration of alignment stability is prevented.

A common electrode 270 is formed on the overcoat 280. The upper alignment layer 21 is formed on the common electrode 270.

As above-described, the overcoat 280 functions as the light absorption layer for absorbing light having the wavelength(s) of a specific range. However, the present invention is not limited thereto, and at least one of the insulating layer (not shown), the passivation layer 180, the color filter 230R, 230G, 230B, the cover layer 250, and the overcoat 280 may be the light absorption layer in an exemplary embodiment of the present invention. Here, the light absorption layer may absorb light of UV wavelength 280 nm to 450 nm. The insulating layer (not shown) indicates a layer interposed between the switching element portion including the signal lines and the thin film transistor, and the insulation substrate 110.

Figure 4:
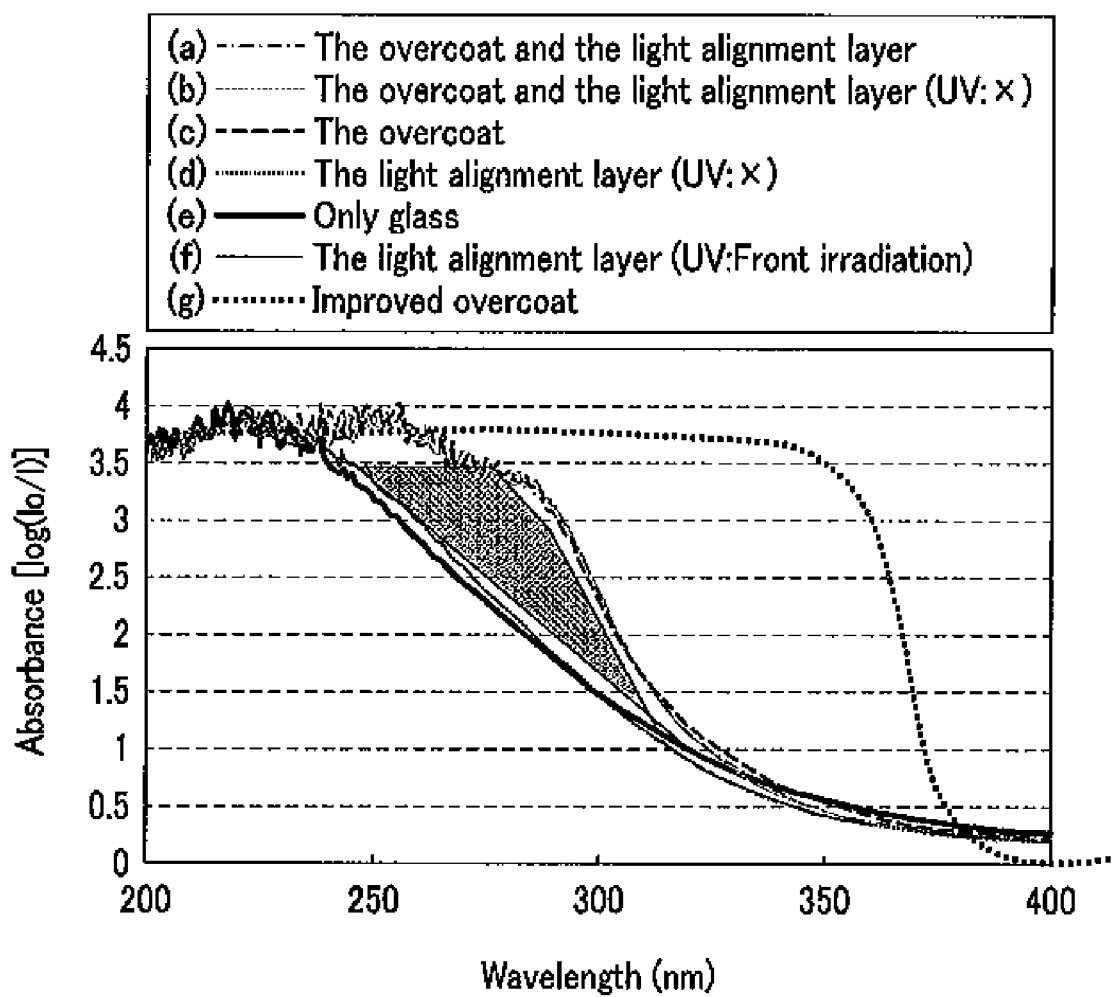
FIG. 4 is a graph showing an absorption spectrum per each layer of the liquid crystal display according to an exemplary embodiment of the present invention.

FIG. 4 is a graph showing an absorption spectrum per layer of the liquid crystal display according to an exemplary embodiment of the present invention.

Referring to FIG. 4, a line a and a line b indicate regions that the light of UV wavelength is absorbed when simultaneously passing the overcoat and the light alignment layer. Only, the line a is observed by an inclination irradiation, and the line b is observed by a vertical irradiation. The wavelengths of light that are easily absorbed are in the range of 200 nm to 280 nm. A line c indicates light absorption in the case where only a conventional overcoat is present and is similar to the line a and the line b. A line d indicates light absorption by the light alignment layer, and a line e indicates light absorption by the insulation substrate (e.g., glass) where the light absorption is generated in the range of about 200 nm to 250 nm. That is, the light may be further absorbed by a P region by using only the conventional overcoat. A line g indicates light absorption in the case where the improved overcoat of the exemplary embodiment of the present invention is used in the liquid crystal display. As shown in FIG. 4, when the improved overcoat is used, a wavelength that is greater than 430 nm may be absorbed. FIG. 4 shows that by using the overcoat of the invention, selective light absorption of the desired wavelength range can be achieved.

Figure 5:
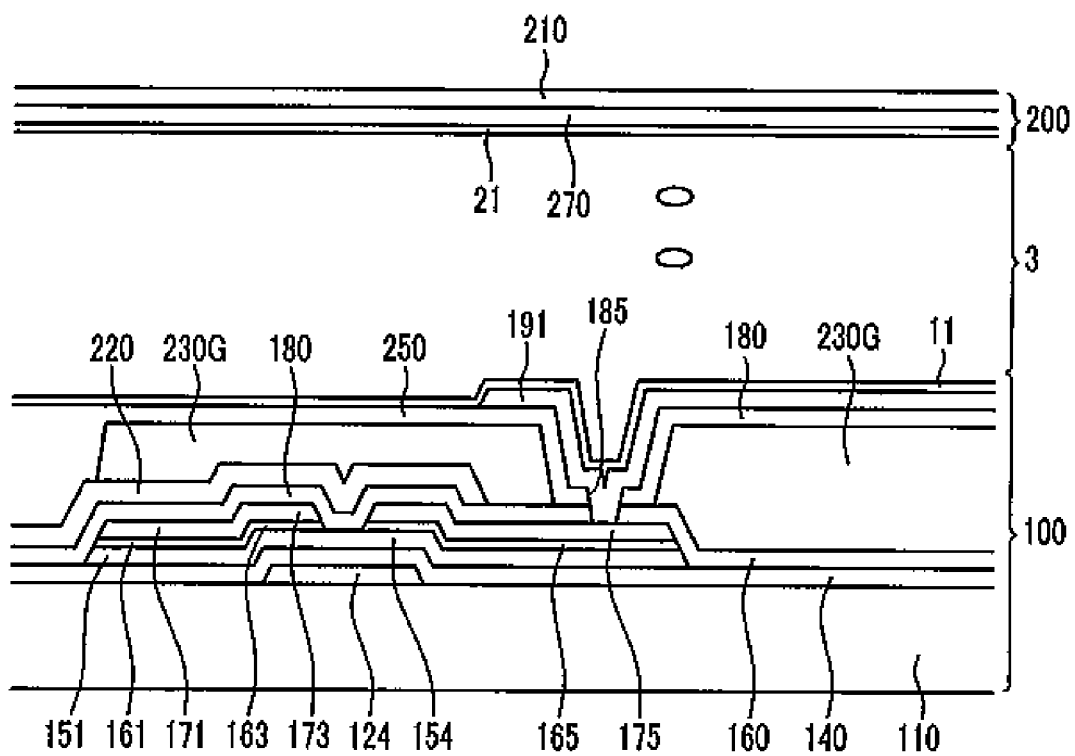
FIG. 5 is a cross-sectional view of the liquid crystal display shown in FIG. 2 taken along the lines III-III according to another exemplary embodiment of the present invention.

FIG. 5 is a cross-sectional view of the liquid crystal display shown in FIG. 2 taken along the lines III-III according to another exemplary embodiment of the present invention.

Referring to FIG. 5, a liquid crystal display according to an exemplary embodiment of the present invention includes a lower panel 100 and an upper panel 200, and a liquid crystal layer 3 interposed between two display panels 100 and 200.

The lower panel 100 has the same components as that of the lower panel shown in FIG. 3 according to an exemplary embodiment of the present invention. Accordingly, the description will focus on the upper panel 200 having the different components from the exemplary embodiment of the present invention shown in FIG. 3.

A common electrode 270 is formed on an insulation substrate 210 made of transparent glass or plastic. An upper alignment layer 21 is formed on the common electrode 270.

The thickness of the common electrode 270 may be in the range of 350 Å to 550 Å. More preferably, the common electrode 270 has the thickness of about 450 Å. The common electrode 270 is made of Indium Zinc Oxide (IZO) or Indium Tin Oxide (ITO). More preferably, the common electrode 270 is made of IZO. Like this, the common electrode 270 has the thickness of about 450 Å such that light having UV wavelength in the range of 280 nm to 450 nm may be absorbed.

Differently from the previous exemplary embodiment of the present invention, the liquid crystal display according to an exemplary embodiment of the present invention does not have an overcoat on the upper panel 200. Instead, the thickness of the common electrode 270 is reduced to obtain the same effects.

Figure 6A:
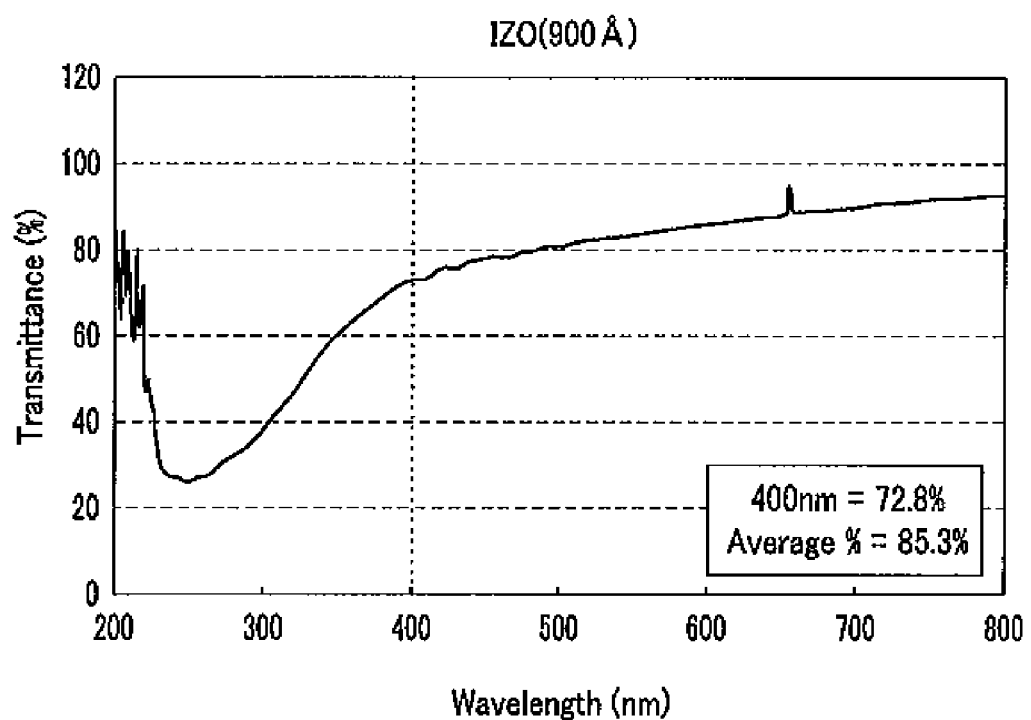
FIG. 6A is a graph showing the transmittance when forming a common electrode with the thickness of 900 Å in the conventional liquid crystal display.

FIG. 6A is a graph showing the transmittance when forming a common electrode with the thickness of 900 Å in the conventional liquid crystal display, and FIG. 5B is a graph showing the transmittance when forming a common electrode with the thickness of 450 Å in the liquid crystal display according to another exemplary embodiment of the present invention.

Figure 6B:
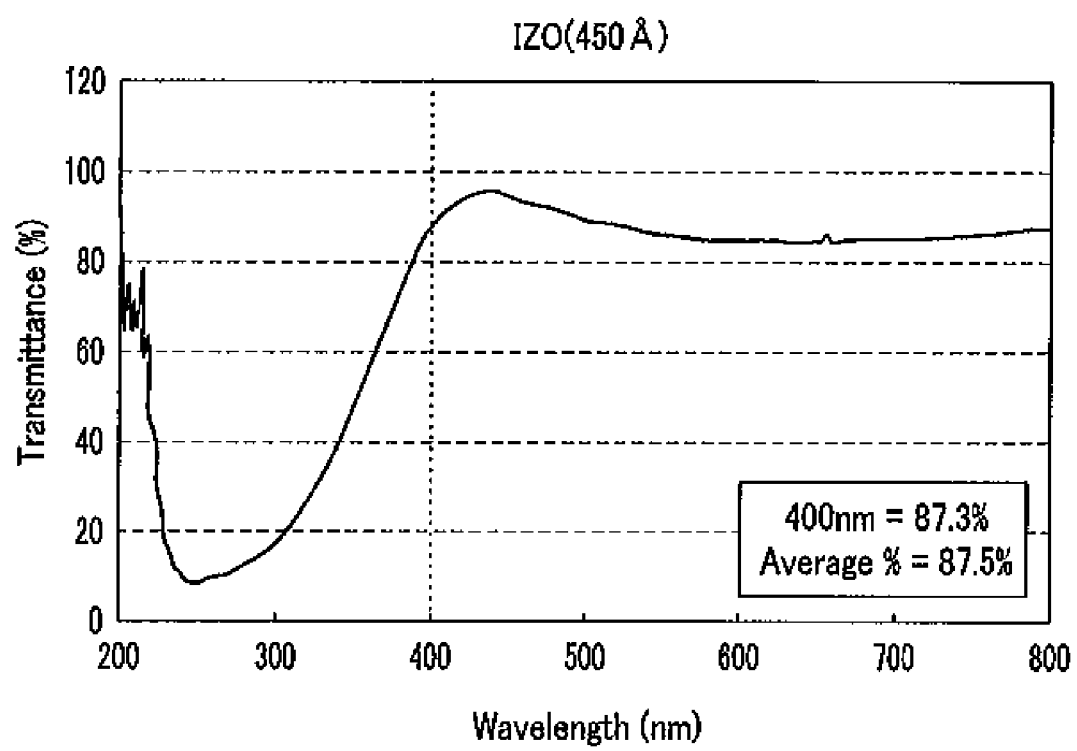
FIG. 6B is a graph showing transmittance when forming a common electrode with the thickness of 450 Å in the liquid crystal display according to another exemplary embodiment of the present invention.

Referring to FIG. 6A and FIG. 6B, comparing the transmittance of wavelengths between about 200 nm and about 400 nm, transmittance is reduced where the common electrode 270 of FIG. 1 has the thickness of 450 Å. That is, when the thickness of the common electrode 270 is 450 Å, light is easily absorbed.

Above, the liquid crystal display including the lower panel having the color filter and the light blocking member according to an exemplary embodiment of the present invention has been described. However, in a liquid crystal display according to another exemplary embodiment of the present invention, a color filter may be only formed on the lower panel, or a light blocking member may be only formed on the lower panel.

Also in a liquid crystal display according to another exemplary embodiment of the present invention, a color filter and a light blocking member may be formed on the upper panel.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a first substrate;
a pixel electrode disposed on the first substrate;
a first alignment layer disposed on the pixel electrode;
a second substrate facing the first substrate;
a common electrode disposed on the second substrate;
a second alignment layer disposed on the common electrode;
a liquid crystal layer disposed between the first alignment layer and the second alignment layer; and
a light absorption layer disposed between the first substrate and the first alignment layer, or the second substrate and the second alignment layer, wherein the light absorption layer absorbs light having a UV wavelength from about 280 nm to about 450 nm,
wherein the light absorption layer includes a polymer layer combined with a light alignment monomer.

2. The liquid crystal display of claim 1, further comprising:
an insulating layer disposed on the first substrate;
a switching element portion disposed on the insulating layer and including signal lines, a source electrode, and a drain electrode;
a passivation layer disposed on the switching element portion;
a color filter disposed on the passivation layer;
a cover layer covering the color filter; and
an overcoat disposed between the second substrate and the common electrode, wherein the drain electrode is connected to the pixel electrode.

3. The liquid crystal display of claim 2, wherein:
at least one of the insulating layer, the passivation layer, the color filter, the cover layer and the overcoat is the light absorption layer.

4. The liquid crystal display of claim 1, wherein:
the light alignment monomer includes an acrylate group or benzene derivative.

5. The liquid crystal display of claim 4, wherein:
the light alignment monomer includes a functional group having one of below-described molecule structures (a) to (g):

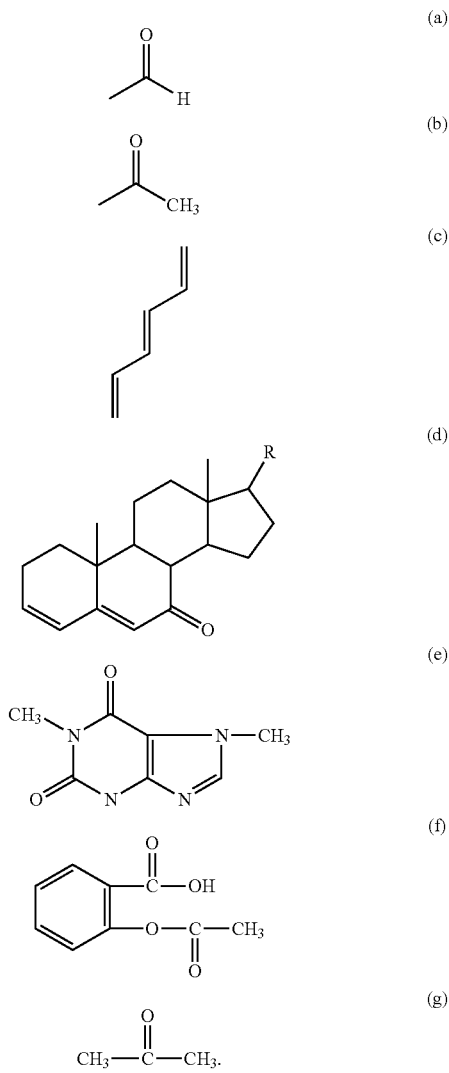

6. The liquid crystal display of claim 4, wherein:
the light absorption layer is made of a photo reactive compound as represented below by Chemical Formula 1,

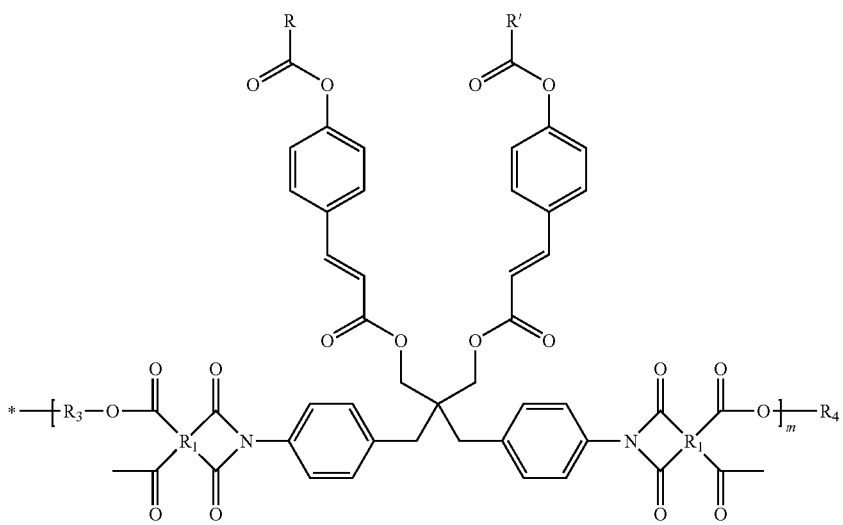

wherein R and R' are $-C_nH_{2n+1}$, n is an integer between 1 and 18, and $R_1$, $R_2$, and $R_3$ are aromatic compounds.

7. The liquid crystal display of claim 1, wherein:
the first alignment layer and the second alignment layer include a polymer layer combined with a light alignment monomer of a cinnamate group.

8. The liquid crystal display of claim 7, wherein:
the polymer layer is formed of one photo reactive compound selected from the group of polyimide and derivatives thereof, polyacrylate and derivatives thereof, polymethylmetacrylate and derivatives thereof, polystyrene and derivatives thereof, and polyvinylalcohol and derivatives thereof.

9. The liquid crystal display of claim 7, wherein:
the first alignment layer and the second alignment layer include the underlying light absorption layer, and the light absorption layer absorbs light of UV wavelength from 280 nm to 450 nm.

10. A liquid crystal display comprising:
a first substrate;
a pixel electrode disposed on the first substrate;
a first alignment layer disposed on the pixel electrode;
a second substrate facing the first substrate;
a common electrode disposed on the second substrate;
a second alignment layer disposed on the common electrode;
a liquid crystal layer disposed between the first alignment layer and the second alignment layer; and
an overcoat disposed between the second substrate and the common electrode, wherein the overcoat absorbs light of UV wavelength from 280 nm to 450 nm,
a switching element portion disposed on the substrate and including signal lines, a source electrode, and a drain electrode;
a passivation layer disposed on the switching element portion;
a color filter disposed on the passivation layer; and
a cover layer covering the color filter, wherein the drain electrode is connected to the pixel electrode.

11. The liquid crystal display of claim 10, further comprising:
a light blocking member disposed between the color filter and the cover layer.

12. The liquid crystal display of claim 10, wherein:
the first alignment layer and the second alignment layer include a structure that a polymer layer combines with a light alignment monomer of a cinnamate group.

13. The liquid crystal display of claim 12, wherein:
the overcoat includes a functional group for absorbing the same wavelength as the UV wavelength absorbed by the monomer of the first alignment layer and the second alignment layer.

14. The liquid crystal display of claim 10, further comprising:
a color filter and a light blocking member formed on the second substrate, wherein the overcoat covers the color filter and the light blocking member.

15. A liquid crystal display comprising:
a first substrate;
a pixel electrode disposed on the first substrate;
a first alignment layer disposed on the pixel electrode;
a second substrate facing the first substrate;
a common electrode disposed on the second substrate;
a second alignment layer disposed on the common electrode;
a liquid crystal layer disposed between the first alignment layer and the second alignment layer; and
an overcoat disposed between the second substrate and the common electrode, wherein the overcoat absorbs light of UV wavelength from 280 nm to 450 nm,
wherein the overcoat includes a polymer layer combined with a light alignment monomer including an acrylate group or benzene derivatives.

16. A liquid crystal display comprising:
a first substrate;
a pixel electrode disposed on the first substrate;
a first alignment layer disposed on the pixel electrode;
a second substrate facing the first substrate;
a common electrode disposed on the second substrate;
a second alignment layer disposed on the common electrode;
a liquid crystal layer disposed between the first alignment layer and the second alignment layer; and
an overcoat disposed between the second substrate and the common electrode, wherein the overcoat absorbs light of UV wavelength from 280 nm to 450 nm, wherein the overcoat is made of a photo reactive compound as represented below by Chemical Formula 2,
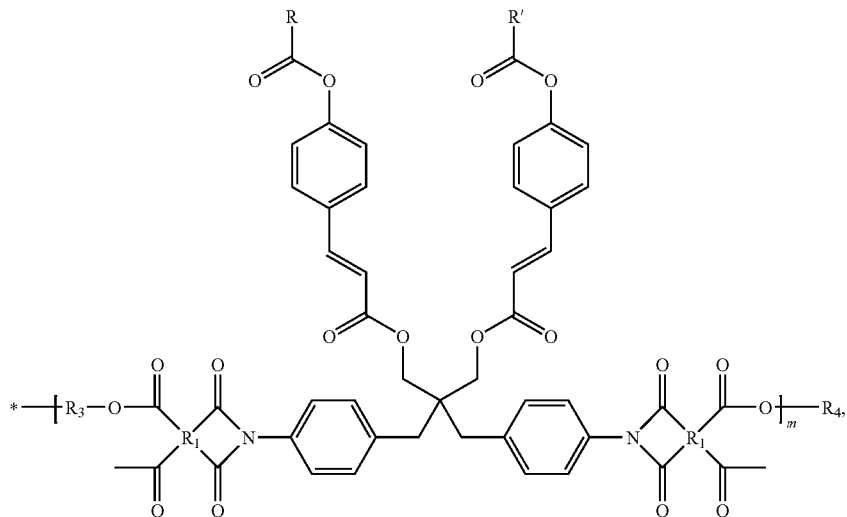
wherein R and R' are —$C_nH_{2n+1}$, n is an integer between 1 and 18, and $R_1$, $R_2$, and $R_3$ are aromatic compounds.
* * * * *